(12) United States Patent
Gianakopoulos

(10) Patent No.: US 11,338,740 B1
(45) Date of Patent: May 24, 2022

(54) MONITOR MOUNTING APPARATUS

(71) Applicant: Kosta Gianakopoulos, Santa Fe Springs, CA (US)

(72) Inventor: Kosta Gianakopoulos, Santa Fe Springs, CA (US)

(73) Assignee: Reinhold Industries, Inc., Santa Fe Springs, CA (US)

( * ) Notice: Subject to any disclaimer, the term of this patent is extended or adjusted under 35 U.S.C. 154(b) by 0 days.

(21) Appl. No.: 17/203,335

(22) Filed: Mar. 16, 2021

Related U.S. Application Data

(60) Provisional application No. 63/128,488, filed on Dec. 21, 2020.

(51) Int. Cl.
*B60R 11/02* (2006.01)
*B64D 11/00* (2006.01)
*B60R 11/00* (2006.01)

(52) U.S. Cl.
CPC .... *B60R 11/0235* (2013.01); *B64D 11/00151* (2014.12); *B60R 2011/0015* (2013.01); *B60R 2011/0085* (2013.01); *B60R 2011/0276* (2013.01)

(58) Field of Classification Search
CPC .............. B60R 11/0235; B64D 11/00151
USPC ........................... 297/188.04, 217.3
See application file for complete search history.

(56) References Cited

U.S. PATENT DOCUMENTS

| 5,507,556 A * | 4/1996 | Dixon ................. B60R 11/0235 297/217.3 |
| 10,926,877 B1 * | 2/2021 | Puglisi ............. B64D 11/00155 |
| 2008/0136230 A1 * | 6/2008 | Ling ................ B64D 11/00151 297/217.3 |

FOREIGN PATENT DOCUMENTS

CN 107444285 A * 12/2017 ............. B60R 11/02

* cited by examiner

*Primary Examiner* — Anthony D Barfield
(74) *Attorney, Agent, or Firm* — James E. Brunton

(57) ABSTRACT

A monitor mounting apparatus for use in connection with passenger vehicles such as aircraft, trains, and buses. The unique pivoting mechanism of the mounting apparatus permits lowering of the monitor in a manner that permits the top of the monitor screen to be visible even to the tallest of passengers.

20 Claims, 5 Drawing Sheets

MONITOR MOUNTING APPARATUS

CROSS-REFERENCE TO RELATED APPLICATIONS

This is a Non-Provisional Application claiming the benefit of Provisional Application No. 63/128,488 filed Dec. 21, 2020.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates generally to a mounting apparatus for mounting a monitor, such as a video monitor, on a vehicle seat. More particularly, the invention concerns a monitor mounting apparatus for use in connection with passenger vehicles such as aircraft, trains, and buses.

DISCUSSION OF THE PRIOR ART

Many passenger seats such as those on passenger aircraft, buses, trains, and the like are arranged so that each passenger seat, other than the forward-most located passenger seats, faces the back of the next forward passenger seat. To increase a passenger's comfort and enjoyment, many passenger seat backs are utilized to install amenities, such as a tray table, for the passenger's use during the trip.

Frequently, commercial passenger carriers, such as airlines, equip their carrier with flight entertainment systems to relieve passenger boredom. In-flight entertainment systems are especially common on aircraft used for flights of long duration. Such entertainment systems typically include a display device, such as a video monitor, that is mounted on the passenger seatback. In the past, the passenger seatback has typically been provided with a cut out within which the video monitor is fixedly mounted. In those instances where the video monitor has been adjustably mounted within the passenger seatback, single pivot tilt mechanisms have undesirably been used. Such single pivot tilt mechanisms typically allow a limited degree of tilt and also tend to permit undesirable shaking of the monitor during use.

As will become clear from the discussion that follows, the monitor mounting apparatus of the present invention represents a substantial improvement over the prior art monitor mounting devices. More particularly, as a result of its unique design, the pivoting mechanism of the mounting apparatus permits lowering of the monitor in a manner that permits the top of the monitor screen to be visible even to the tallest of passengers.

SUMMARY OF THE INVENTION

It is an object of the present invention to provide a novel monitor mounting apparatus that can be quickly and easily connected to the passenger seatback.

Another object of the invention is to provide a monitor mounting apparatus of the aforementioned character that includes a unique monitor pivoting mechanism that insures that as the monitor is lowered from its stowed position, the top of the monitor screen remains clearly visible.

Another object of the invention is to provide a monitor mounting apparatus of the character described in the preceding paragraphs in which, by allowing the monitor to move downward and outward while tilting, the top of the monitor moves down and does not encroach on the space behind the monitor, thereby creating a greater tilt angle than as possible with apparatus of a single pivot design.

Another object of the invention is to provide a monitor mounting apparatus as described in the preceding paragraph in which the monitor remains stable and relatively free from vibration.

Another object of the invention is to provide a monitor mounting apparatus as described in the preceding paragraphs which is easy to use and easy to install on the seatback.

Still another object of the invention is to provide a monitor mounting apparatus that is sturdy, of long life, and highly reliable in operation.

DESCRIPTION OF THE INVENTION

Figure 1:
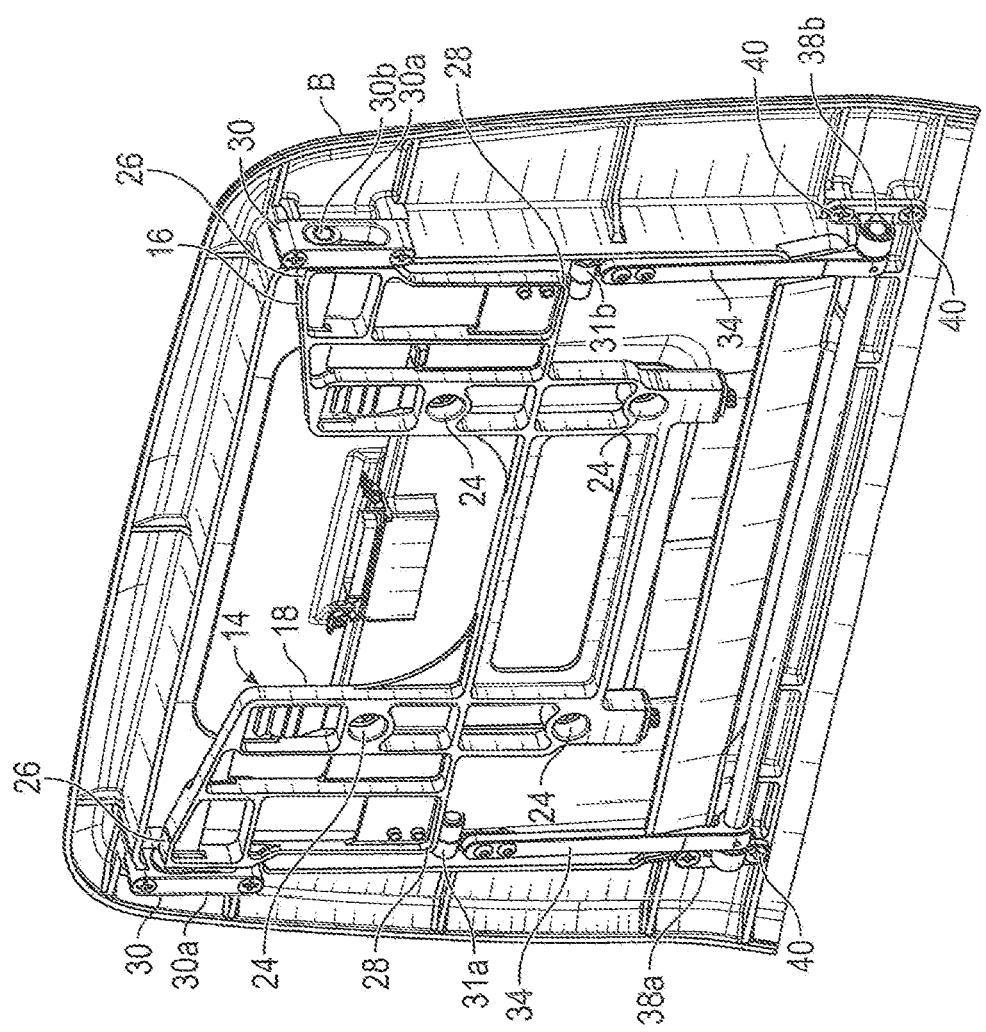
FIG. 1 is a generally perspective view of one form of the monitor mounting apparatus as it appears when mounted on the back of a passenger seat.
Figure 2:
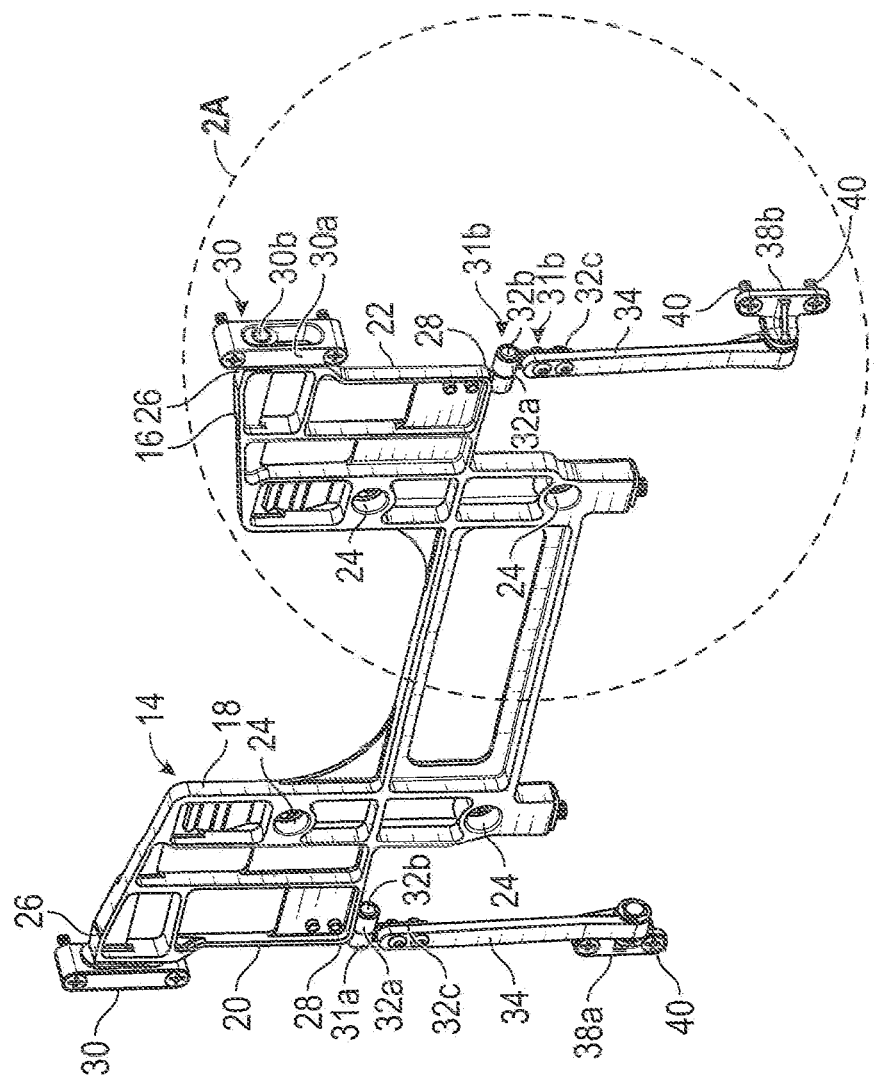
FIG. 2 is a generally perspective view of one form of the monitor mounting apparatus of the invention as it appears prior to being connected to the back of the passenger seat.

Referring to the drawings and particularly to FIGS. 1 and 2, one form of the monitor mounting apparatus of the invention is there illustrated and identified by the numeral 14. In FIG. 1, apparatus 14 is shown mounted on the back "B" of a conventional passenger seat, such as an aircraft seat, and in FIG. 2 is shown as it appears prior to being mounted on the seatback. Referring particularly to FIG. 2, monitor mounting apparatus 14 can be seen to comprise mounting frame 16 having a central portion 18 and a first and second wing portions 20 and 22 that are connected to central portion 18. Central portion 18 is provided with four spaced apart monitor connector receiving apertures 24 and each of the first and second wing portions has an upper corner 26 and a lower corner 28.

Figure 2A:
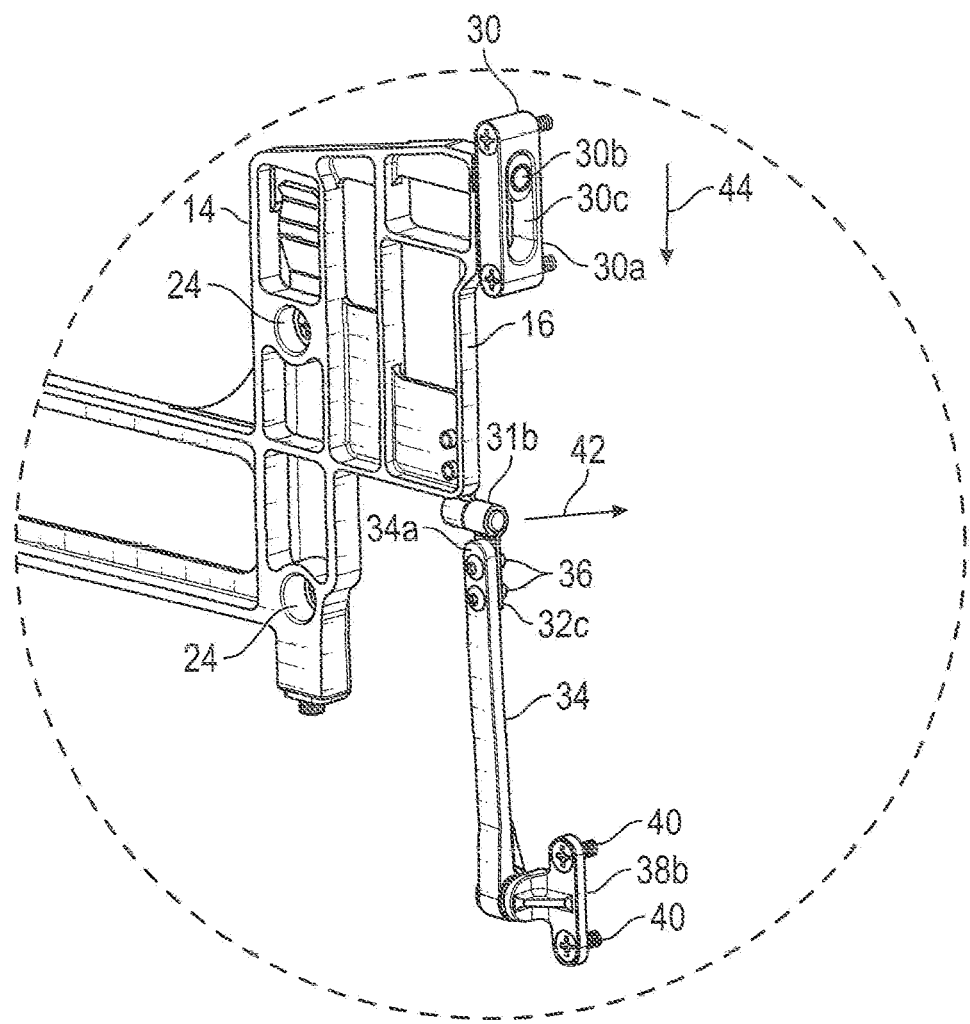
FIG. 2A is a greatly enlarged, generally perspective view of the area designated in FIG. 2 as 2A with directional arrows showing the direction of portions of the mounting apparatus during movement of the monitor out of its stowed position.

For a reason presently to be discussed, a sliding pivot hinge 30 is connected to the upper corner 26 of each of the wing portions 20 and 22. Each sliding pivot hinge 30 has a body portion 30a, a barrel portion 30b and a guide channel 30c formed in the body portion. During operation of the mounting apparatus, barrel portion 30b is movable within guide channel 30c from a first upper position (see FIG. 2A) to a second lower position (see FIG. 4A). First and second lower pivot hinges 31a and 31b are connected to the lower corner 28 of wing portions 20 and 22. Each pivot hinge has a barrel portion 32a, a shaft portion 32b and a downwardly extending leg portion 32c. Pivot hinges 31a and 31b are readily commercially available from various sources, including the Reell Company of St. Paul Minn.

Connected to the downwardly extending leg portion 32c of the first lower pivot hinge 32 is an elongate pivot linkage 34 and connected to the downwardly extending leg portion of the second lower pivot hinge 32 is an elongate pivot hinge 34. As best seen by referring to FIG. 2A, the upper end 34a of each of the pivot linkages is connected to leg portion 32c by means of connectors 36. Connected to the lower ends of the pivot linkages are conventional pivot hinges 38 and 38b, which, in turn, are connected to the passenger seatback by connectors 40 (FIG. 1).

Figure 3:
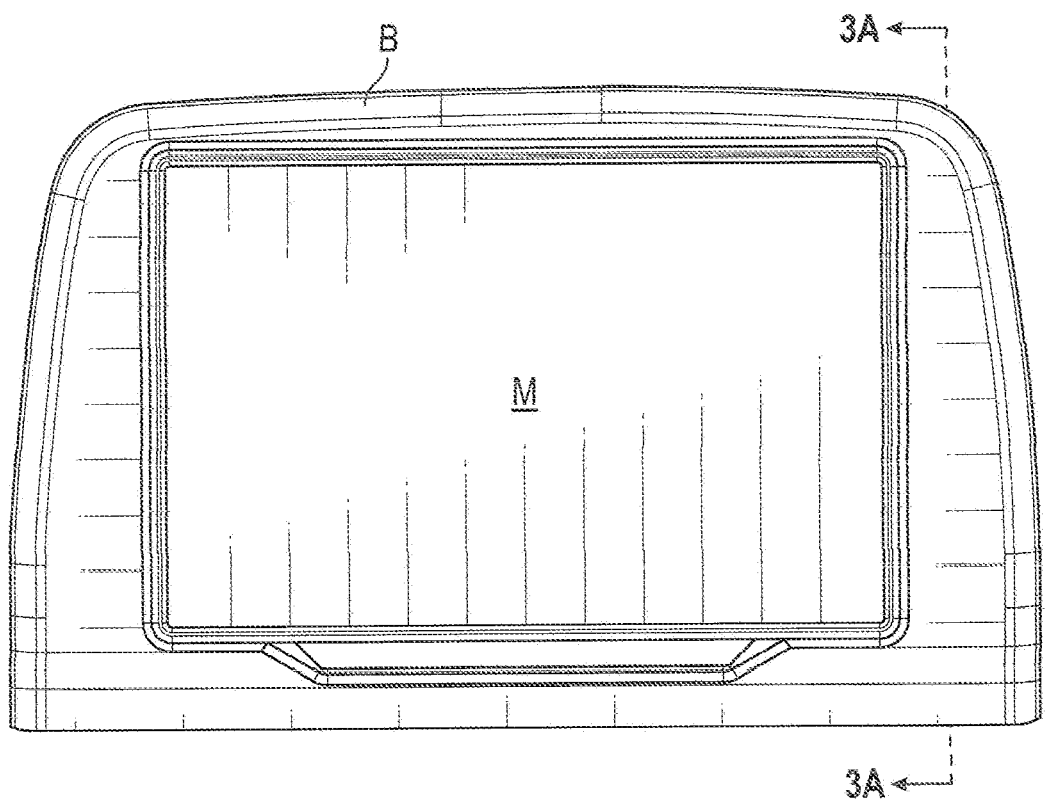
FIG. 3 is a front view showing the monitor mounted on a passenger seatback and deployed into a first tilt position.
Figure 3A:
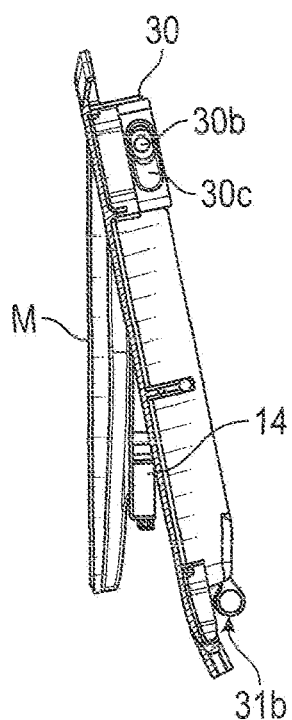
FIG. 3A is a view taken along lines 3A-3A of FIG. 3.
Figure 4:
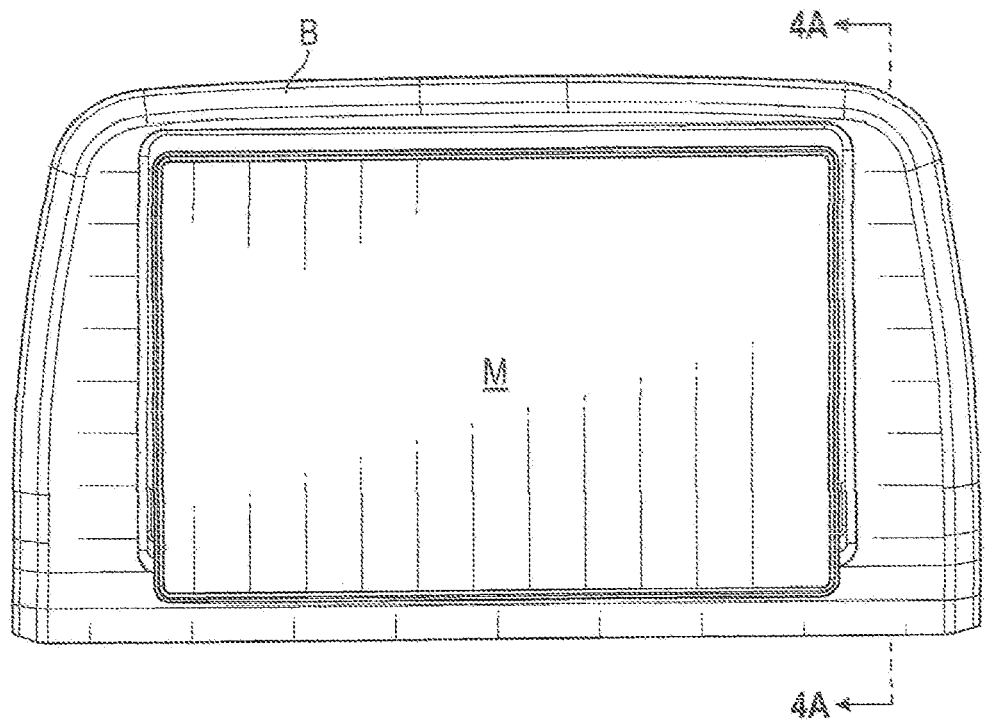
FIG. 4 is a front view similar to FIG. 3 showing the monitor mounted on a passenger seatback and deployed into a second tilt position.
Figure 4A:
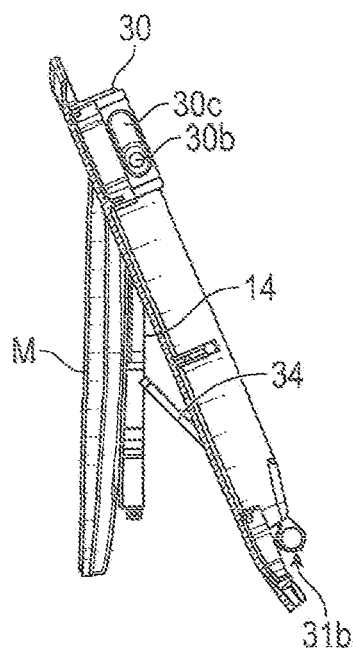
FIG. 4A is a view taken along lines 4A-4A of FIG. 4.

With the monitor mounting apparatus of the invention 14 securely connected to the seat back B and with the monitor M securely connected to the monitor mounting apparatus, the monitor can be readily tilted by the passenger from its stowed position to various tilted positions, such as those illustrated in FIGS. 3A and 4A of the drawings. As the monitor is moved from its stowed position, the pivot hinges 31a and 31b are moved inwardly in the direction of the arrow 42 of FIG. 2A. Similarly, as hinge 32 moves inwardly, barrel portion 30b of hinge 30 moves downwardly within channel 30c in the direction of the downward arrow 44 of FIG. 2A. As illustrated in FIG. 3A of the drawings, when the passenger moves the monitor from the stowed position into the first partially deployed position there shown, barrel portion 30b of hinge 30 moves downwardly into an intermediate position. However, as illustrated in FIG. 4A of the drawings, when the passenger moves the monitor into the second fully deployed position there shown, barrel portion 30b of hinge 30 moves fully downwardly within channel 30c. At the same time, pivot linkage 34 moves angularly inward into the position shown in FIG. 4A. With the monitor lowered into the fully deployed position shown in FIG. 4A, the top of the monitor screen remains clearly visible.

More particularly, with the novel monitor mounting apparatus of the character thusly described, by allowing the monitor to move downward and outward while tilting, the top of the monitor moves down and does not encroach on the space behind the monitor, thereby creating a greater tilt angle than as possible with apparatus of a single pivot design.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention as set forth in the following claims.

I claim:

1. A mounting apparatus for mounting a monitor to a passenger seat back, the apparatus comprising:
   (a) a mounting frame;
   (b) first and second sliding pivot hinges connected to said mounting frame, each of said first and second sliding pivot hinges having a body portion and a barrel portion movable within said body portion from a first position to a second position;
   (c) first and second upper pivot hinges connected to said mounting frame, each of said first and second upper pivot hinges having a body portion, a barrel portion and a leg portion; and
   (d) a first lower pivot hinge connected to said first upper pivot hinge and a second lower pivot hinge connected to said second upper pivot hinge.

2. The mounting apparatus as defined in claim 1 in which said mounting frame is provided with a plurality of connector receiving apertures for use in connecting said mounting frame to the passenger seat back.

3. The mounting apparatus as defined in claim 1 in which said mounting frame is movable relative to the passenger seat back from a first position to a second position.

4. The mounting apparatus as defined in claim 1 in which said upper and lower pivot hinges are interconnected by an elongate pivot linkage.

5. The mounting apparatus as defined in claim 1 in which said mounting frame has a central portion and a first and second wing portions connected to said central portion.

6. The mounting apparatus as defined in claim 5 in which said first sliding pivot hinge is connected to said first wing portion and in which said second sliding pivot hinge is connected to said second wing portion.

7. The mounting apparatus as defined in claim 5 in which said first and second upper pivot hinges are connected to said wing portions.

8. The mounting apparatus as defined in claim 5 in which each of said first and second sliding pivot hinges includes a plurality of connectors for connecting said first and second sliding pivot hinges to the passenger seat back.

9. The mounting apparatus as defined in claim 5 in which each of said first and second lower pivot hinges includes a plurality of connectors for connecting said first and second lower pivot linkages to the passenger seat back.

10. A mounting apparatus for mounting a monitor to a passenger seat back, the apparatus comprising:
    (a) a mounting frame having a central portion and a first and second wing portions connected to said central portion;
    (b) a first sliding pivot hinge connected to said first wing portion, said first sliding pivot hinge having a body portion and a barrel portion movable within said body portion from a first upper position to a second lower position;
    (c) a second sliding pivot hinge connected to said second wing portion, said second sliding pivot hinge having a body portion and a barrel portion movable from a first upper position to a second lower position;
    (d) a first pivot hinge connected to said first wing portion, said first pivot hinge having a body portion and a barrel portion;
    (e) a second pivot hinge connected to said second wing portion, said second pivot hinge having a body portion and a barrel portion;
    (f) a first, lower pivot hinge connected to said first pivot hinge, said first lower pivot hinge having a body portion and a barrel portion; and
    (g) a second, lower pivot hinge connected to said first second hinge, said second lower pivot hinge having a body portion and a barrel portion.

11. The mounting apparatus as defined in claim 10 further including a first elongate pivot linkage interconnecting said first pivot hinge and said first lower pivot hinge.

12. The mounting apparatus as defined in claim 11 further including a second elongate pivot linkage interconnecting said second pivot hinge and said second lower pivot hinge.

13. The mounting apparatus as defined in claim 12 in which each of said first and second lower pivot hinges includes a plurality of connectors for connecting said first and second elongate pivot linkages to the passenger seat back.

14. The mounting apparatus as defined in claim 11 in which said central portion of said mounting frame includes a plurality of connectors for connecting said mounting frame to the passenger seat back.

15. The mounting apparatus as defined in claim 11 in which each of said first and second sliding pivot hinges includes a plurality of connectors for connecting said first and second sliding pivot hinges to the passenger seat back.

16. The mounting apparatus as defined in claim 11 in which said body portion of each of said first and second sliding pivot hinges includes a guide channel within which said barrel portion of said sliding pivot hinges travels.

17. A mounting apparatus for mounting a monitor to a passenger seat back, the apparatus comprising:
- (a) a mounting frame having a central portion and a first and second wing portions connected to said central portion, each of said first and second wing portions having an upper corner and a lower quarter;
- (b) a first sliding pivot hinge connected to said upper corner of said first wing portion, said first sliding pivot hinge having a body portion and a barrel portion movable within said body portion from a first upper position to a second lower position;
- (c) a second sliding pivot hinge connected to said upper corner of said second wing portion, said second sliding pivot hinge having a body portion and a barrel portion movable from a first upper position to a second lower position;
- (d) a first pivot hinge connected to said lower corner of said first wing portion, said first pivot hinge having a body portion and a barrel portion;
- (e) a second pivot hinge connected to said lower corner of said second wing portion, said second pivot hinge having a body portion and a barrel portion;
- (f) a first elongate pivot linkage having an upper end and a lower end, said upper end of said first elongate pivot linkage being connected to said first pivot hinge;
- (g) a second elongate pivot linkage having an upper end and a lower end, said upper end of said second elongate pivot linkage being connected to said second pivot hinge;
- (h) a first, lower pivot hinge having a body portion and a barrel portion, said barrel portion being connected to said lower end of said first elongate pivot linkage; and
- (i) a second, lower pivot hinge having a body portion and a barrel portion, said barrel portion being connected to said lower end of said second elongate pivot linkage.

18. The mounting apparatus as defined in claim 17 in which said central portion of said mounting frame includes a plurality of connectors for connecting said mounting frame to the passenger seat back.

19. The mounting apparatus as defined in claim 17 in which each of said first and second sliding pivot hinges includes a plurality of connectors for connecting said first and second sliding pivot hinges to the passenger seat back.

20. The mounting apparatus as defined in claim 17 in which said body portion of each of said first and second sliding pivot hinges includes a guide channel within which said barrel portion of said sliding pivot hinges travels.

\* \* \* \* \*